No. 732,710. PATENTED JULY 7, 1903.
H. CAUZARD.
MOTOR ROAD VEHICLE.
APPLICATION FILED MAR. 31, 1900.
NO MODEL.
Fig. 1.
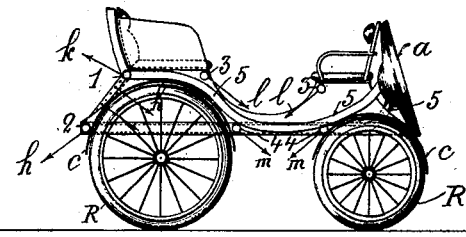
Fig. 2. Fig. 3.
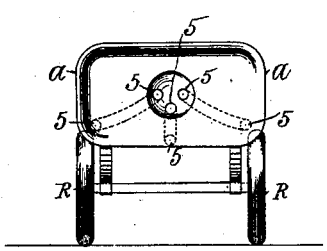 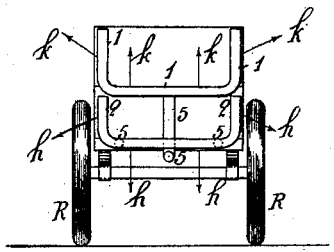
Fig. 4.
Fig. 5. Fig. 6.
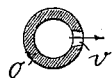 
Witnesses.
Albert Jones.
Harry W. Bailey
Inventor.
Henri Cauzard
By his Attorneys.
Wheatley & MacKenzie
THE NORRIS PETERS CO., PHOTO-LITHO., WASHINGTON, D. C.

No. 732,710. Patented July 7, 1903.

UNITED STATES PATENT OFFICE.

HENRI CAUZARD, OF TROYES, FRANCE.

MOTOR ROAD-VEHICLE.

SPECIFICATION forming part of Letters Patent No. 732,710, dated July 7, 1903.

Application filed March 31, 1900. Serial No. 10,956. (No model.)

*To all whom it may concern:*

Be it known that I, HENRI CAUZARD, a citizen of the Republic of France, residing at 9 Rue Varveu, Troyes, Aube, in the Republic of France, have invented certain new and useful Improvements in or Connected with Motor Road-Vehicles, (for which I have made application for patent in France on September 23, 1899; in Germany on January 22, 1900, and in Great Britain on December 11, 1899;) and I do hereby declare the following to be a full, clear, and exact description of the invention, such as will enable others skilled in the art to which it appertains to make and use the same.

This invention for improvements in or connected with motor road-vehicles has for its object to provide a means for preventing the dust raised by the wheels of motor-vehicles from entering that portion of the atmosphere which is in the immediate proximity of the passengers, even though they may be in an open carriage.

The entrance of the dust into the interior of the vehicle being largely due to the vacuum produced at the rear through the displacement of air by the moving vehicle, this invention comprises means for filling up as rapidly as possible the vacuum caused by the displacement of the air by collecting the air in front of the vehicle and conveying it to the back of the same, then completing the action of the air by injecting other air through the action of a pump or fan driven by means of the motor of the vehicle in order to act on such air, so as to cause it to prevent the cloud of dust from rising and entering the vehicle.

The accompanying drawings illustrate the application of this invention to motor roadvehicles with an open carriage.

Figure 1 is a side view of the carriage with the parts for collecting and distributing the air. Figs. 2 and 3 are respectively back and front sectional views of the vehicle. Fig. 4 is a longitudinal transverse section of the body of the air-distributing conduit with junctions at each of the openings. Figs. 5 and 6 are sections of air-distributing tubes each with a longitudinal slot.

In the front of the vehicle I arrange a large funnel $a$, intended for collecting the air and distributing it by means of the pipes 5, running along the sides of the vehicle and under the body thereof in its longitudinal axis toward the back of the vehicle or toward the back and at the side of the vehicle. This air is dispersed at the back, being forced to pass through a conduit 2, which stands up vertically or obliquely along the sides of the back of the vehicle. The pipe or conduit 2 is perforated to allow the air to escape in the direction of the arrows $h$. The axial pipe 5 conducts the air into another pipe 1, likewise placed at the back of the vehicle and standing up at the ends vertically or obliquely along the sides and facing the wheels R, for example. This pipe produces a second stream of air in the direction of the arrows $k$. The collecting of the air as the vehicle moves is completed by the injection of other air, effected by working a fan or a pump by means of motive power obtained from the motor of the vehicle, or, again, by operating a steaminjector with compressed air or other fluids, according to what is employed in the vehicle. This adventive air may be injected into the pipe system 5 and be distributed at the back of the vehicle in the direction of the arrows $h$ and $k$ at the same time as that caught by the funnel $a$, or, again, this air may be distributed through the conduits 3 and 4 laterally at the sides of the vehicle and in the direction of the arrows $l$ and $m$, for instance.

The pipe systems 1 to 5 may be independent or joined together, so as to obtain large airsurfaces $1^k$ $2^h$ $3^l$ $4^m$ in the desired directions for the purpose of driving the air charged with dust from the inside of the vehicle.

The conduits 1 to 5 may be formed by pipes $o$, with junctions $p$, (see Fig. 4,) or furnished with conical openings $v'$, Fig. 5, or, again, slotted longitudinally or provided with a longitudinal base $u$, Fig. 6, in the form of a wide longitudinal slot. The air which escapes through these holes or slots forms a moving air-screen, shutting off the inside of the vehicle from the external atmosphere surrounding it.

What I claim, and desire to secure by Letters Patent, is—

1. The combination with a road-vehicle, of a large funnel-shaped air-collector $a$ arranged in front thereof, and pipes 5 leading therefrom rearwardly and at opposite sides of the body of the vehicle and exteriorly thereof, the rear ends of the pipes terminating at the rear of the vehicle-body, the said pipes being provided with exit-orifices along the sides of the vehicle whereby to adapt the same to discharge air collected by the collector $a$ in a direction away from the vehicle-body, and a pipe 1 into which the pipes 5 conduct air and having upturned end portions provided with discharge-openings.

2. The combination with a road-vehicle, of a large funnel-shaped air-collector $a$ arranged in front thereof, pipes 5 leading rearwardly from said air-collector along the sides of the vehicle-body and exteriorly thereof, and being provided with exit-orifices adapted to discharge fine streams of air along the sides of the vehicle-body and laterally thereof, said pipes 5 having upwardly-bent portions 2 lying adjacent to the lateral edges of the back of the vehicle, and the perforated pipe 1 with which the pipes 5 communicate and standing vertically along the sides, substantially as described.

In testimony whereof I have affixed my signature in presence of two witnesses.

HENRI CAUZARD.

Witnesses:
  JULIEN MENARD,
  ALBERT MAULVAULT.